United States Patent
Hosokawa

(10) Patent No.: US 9,325,870 B2
(45) Date of Patent: Apr. 26, 2016

(54) IMAGE READING APPARATUS

(71) Applicant: Yasuhiro Hosokawa, Fuso-cho (JP)

(72) Inventor: Yasuhiro Hosokawa, Fuso-cho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 18 days.

(21) Appl. No.: 14/039,869

(22) Filed: Sep. 27, 2013

(65) Prior Publication Data

US 2014/0153069 A1     Jun. 5, 2014

(30) Foreign Application Priority Data

Nov. 30, 2012  (JP) ................. 2012-262903

(51) Int. Cl.
  *H04N 1/04* (2006.01)
  *H04N 1/00* (2006.01)

(52) U.S. Cl.
  CPC ................. *H04N 1/00557* (2013.01)

(58) Field of Classification Search
  CPC .................................................. H04N 1/00557
  USPC ........................................ 358/497, 498, 474
  See application file for complete search history.

(56) References Cited

U.S. PATENT DOCUMENTS

| | | | | |
|---|---|---|---|---|
| 6,788,439 B2* | 9/2004 | Lu et al. | | 358/487 |
| 8,036,587 B2* | 10/2011 | Satoh | | H04N 1/00519 399/189 |
| 8,510,301 B2* | 8/2013 | Cardamore | | G06F 17/30017 707/736 |
| 2003/0206224 A1 | 11/2003 | Sakakibara et al. | | |
| 2005/0207810 A1* | 9/2005 | Fukumura | | 399/367 |
| 2008/0100872 A1 | 5/2008 | Ito | | |
| 2009/0148179 A1* | 6/2009 | Tamura et al. | | 399/107 |
| 2009/0235490 A1* | 9/2009 | Kurokawa et al. | | 16/343 |
| 2010/0158560 A1 | 6/2010 | Watanabe | | |
| 2012/0155941 A1 | 6/2012 | Kozaki et al. | | |

FOREIGN PATENT DOCUMENTS

| | | |
|---|---|---|
| CN | 101329523 A | 12/2008 |
| CN | 101458473 A | 6/2009 |
| JP | 2003-115976 A | 4/2003 |
| JP | 2004-262201 A | 9/2004 |
| JP | 2004-262601 A | 9/2004 |
| JP | 2012-126530 A | 7/2012 |

OTHER PUBLICATIONS

Dec. 2, 2015—(CN) First Office Action—App 201310451287.5—Eng Tran.

* cited by examiner

*Primary Examiner* — Houshang Safaipour
(74) *Attorney, Agent, or Firm* — Banner & Witcoff, Ltd.

(57) ABSTRACT

An image reading apparatus includes a main body and a reading unit. The reading unit includes: a document table; a lower supporting member that supports the document table from below; an upper supporting member that contacts an upper side of the document table and clamps the document table with the lower supporting member; and a reading device. The main body includes an exterior member arranged in a position adjacent to the upper supporting member when the reading unit is in a close position. One of the upper supporting member and the exterior member includes an abutting portion and the other includes an abutted portion so as to configure a positioning mechanism for establishing positioning of a relative position between the upper supporting member and the exterior member in an up-down direction.

19 Claims, 9 Drawing Sheets

IMAGE READING APPARATUS

CROSS-REFERENCE TO RELATED APPLICATIONS

This application claims priority from Japanese Patent Application No. 2012-262903 filed on Nov. 30, 2012, the entire subject matter of which is incorporated herein by reference.

TECHNICAL FIELD

Illustrative aspects of the present invention relate to an image reading apparatus.

BACKGROUND

There has been proposed an image reading apparatus having a lower unit incorporating an image sensor and an upper unit incorporating an automatic document feeder, in which the upper unit is arranged to open and close relatively to the lower unit.

In a multi-function device having an image forming apparatus in addition to the image reading apparatus of this kind, the multi-function device may be configured to have a lower unit incorporating the image forming apparatus and an upper unit incorporating the image reading apparatus, in which the upper unit is arranged to open and close relatively to the lower unit.

In a device having the above-described open-and-close structure, it may be required to establish positioning between the upper unit and the lower unit when the upper unit is closed. For this purpose, the related-art technique disposes a convex portion to a lower part of the upper unit and a concave portion to an upper part of the lower unit such that positioning between the upper unit and the lower unit can be established by fitting the convex portion and the concave portion together.

SUMMARY

In some cases, it may be desired to form the above-described device to have an exterior appearance that part of the lower unit and part of the upper unit are arranged in positions adjacent to each other without raising a substantial difference in level across a boundary between top surfaces of the lower unit and the upper unit so as to have a flat plane.

In such a structure, if the both units are vertically positioned with less accuracy, it may cause a large difference in level across the boundary and induce variations in size of differences in level, so that a quality of the exterior appearance may be deteriorated. In order to eliminate such a problem, it is important to improve the positional accuracy vertically of the both units.

However, even if the convex portion is disposed in the lower part of the upper unit as in the related art, it is usual that a plurality of elements are interposed between the convex portion and an element configuring the top surface of the upper unit. Accordingly, if there are variations of assembly accuracy in a range of tolerances of the plurality of elements, the tolerances cumulate one over another. This may cause a problem that even in a case where positioning between the upper unit and the lower unit is established by making use of the convex portion disposed to a lower part of the upper unit, the positional relationship between the top surfaces of the upper and lower units varies.

Therefore, illustrative aspects of the present invention provide an image reading apparatus configured to less cause a difference in level across a boundary between a part of a lower unit and a part of an upper unit.

According to one illustrative aspect of the present invention, there is provided an image reading apparatus comprising: a main body having an opening in an upper face side thereof; and a reading unit that is mounted on the main body and is configured to move between a close position in which the opening is closed and an open position in which the opening is opened. The reading unit comprises: a document table; a lower supporting member that supports the document table from below; an upper supporting member that is in contact with an upper side of the document table and clamps the document table with the lower supporting member; and a reading device that is arranged between the document table and the lower supporting member and is configured to read an image of a document placed on the document table. The main body comprises an exterior member arranged in a position adjacent to the upper supporting member in a case where the reading unit is moved to the close position. One of the upper supporting member and the exterior member comprises an abutting portion and the other of the upper supporting member and the exterior member comprises an abutted portion, which the abutting portion is configured to be placed in direct abutment against in the case where the reading unit is moved to the close position, so as to configure a positioning mechanism. The positioning mechanism is configured to establish positioning of a relative position between the upper supporting member and the exterior member in an up-down direction.

According thereto, when the reading unit is moved to the close position, the positioning mechanism brings the abutting portion and the abutted portion into direct abutment to thereby establish positioning between the upper supporting member and the exterior member in the up-down direction.

Therefore, it makes possible to eliminate the tolerance cumulation resulting from the intervention of many members, differently from the related-art structure where positioning between the upper supporting member and the exterior member is established with interposing many members therebetween. Thus, the positioning between the upper supporting member and the exterior member can be accurately established, so that a difference in level can be prevented or suppressed from occurring in the up-down direction across a boundary of the upper supporting member and the exterior member.

DETAILED DESCRIPTION

Exemplary embodiments according to the present invention will now be described. In the present exemplary embodiment, a multi-function device having a function (of scanning) of an image reading apparatus and, in addition, other functions (e.g. printing, copying, facsimile transmission/reception, etc.) is exemplified as an example of an image reading apparatus.

In the following, various parts of a multi-function device are explained by use of directional indications of up, down, left, right, front and rear given in each figure. These directional indications are merely to briefly explain the relative positional relationship of various parts of a multi-function device but not intended to restrict the relative position to a site where to set up a multi-function device, the relative position of a multi-function device to a user, or the like.

[Configuration of the Multi-Function Device]

Figure 1:
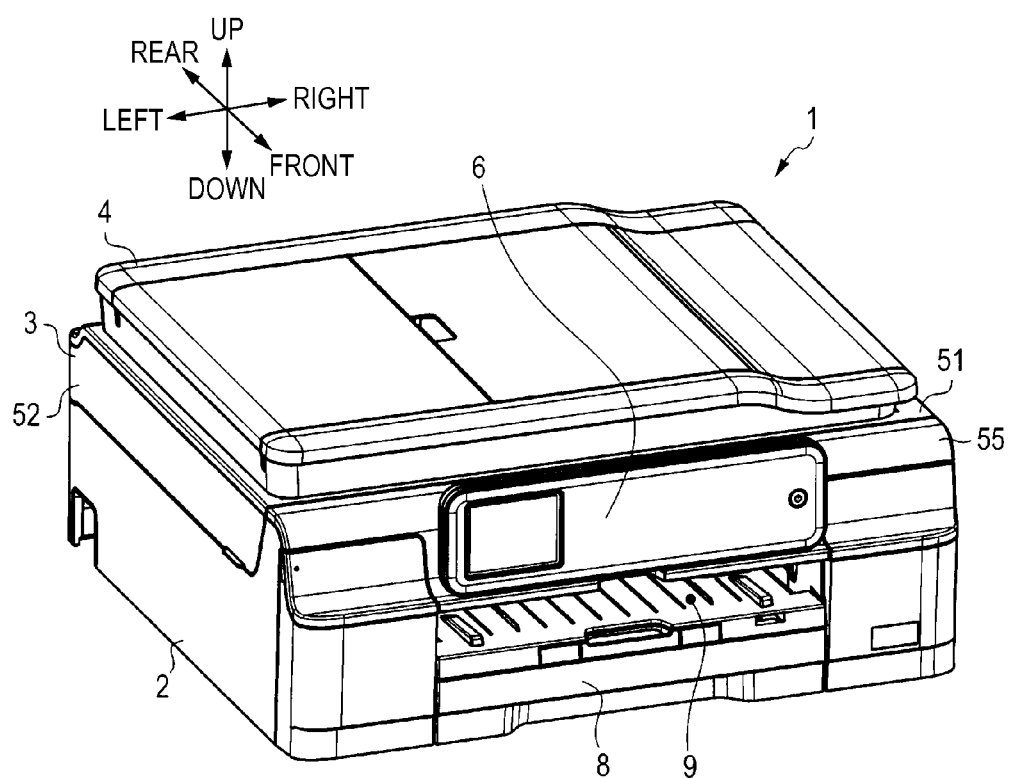
FIG. 1 is a perspective view showing an exterior appearance of a multi-function device.

A multi-function device 1 includes a main body 2, a reading unit 3 mounted on the main body 2 and an ADF unit 4 mounted on the reading unit 3, as shown in FIG. 1. The reading unit 3 has a configuration corresponding to a flatbed image scanner. The ADF unit 4 has a configuration corresponding to an ADF (Automatic Document Feeder). The reading unit 3 and the ADF unit 4 cooperatively provide the function of an ADF-type image scanner.

A control panel 6 configured to be operated by a user, is disposed in a front upper region of the main body 2. A sheet cassette 8 configured to accommodate a recording medium before printing is attached to a lower part of the main body 2. A sheet discharge port 9, through which recording medium after printing can be taken out, is disposed in a position front of the main body 2, below the control panel 6 and above the sheet cassette 8.

Figure 2:
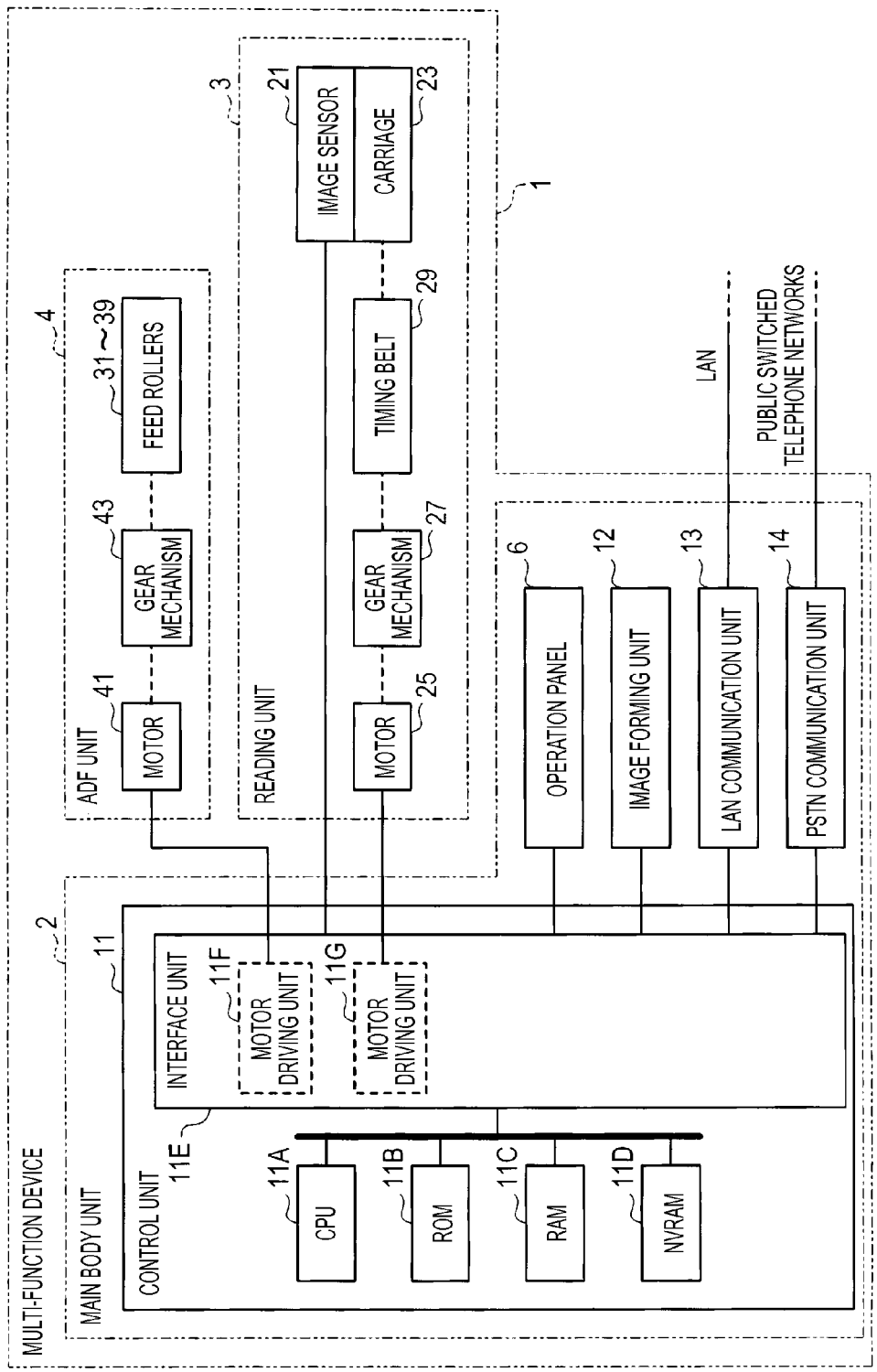
FIG. 2 is a block diagram showing an internal configuration of the multi-function device.

As shown in FIG. 2, the main body 2 includes a control unit 11, an image forming unit 12, a LAN communication unit 13 and a PSTN communication unit 14, in addition to the control panel 6. The control unit 11 has a CPU 11A, a ROM 11B, a RAM 11C, an NVRAM 11D, an interface unit 11E and so on. The CPU 11A executes a predetermined process according to a control program stored in the ROM 11B or RAM 11C and thereby effects control over various units of the multi-function device 1.

The image forming unit 12 has an electrophotographic or inkjet print mechanism. The LAN communication unit 13 is configured by a communication interface device compatible with wireless LANs and a communication interface device compatible with wired LANs. The PSTN communication unit 14 is configured by various devices, including FAX modems and voice codecs, required in connection to public switched telephone networks (PSTNs).

The control panel 6 includes: an input device (e.g. a touch panel, buttons and switches) configured to be operated by the user when the user inputs various instructions to the multi-function device 1; and an output device (e.g. a liquid crystal display) for informing the user of operation states, etc. of the multi-function device 1.

The reading unit 3 includes a line image sensor 21 having a plurality of reading elements and a carriage 23 configured to hold the image sensor 21. The image sensor 21 is given as a contact image sensor (CIS), in the present exemplary embodiment.

Further, the reading unit 3 includes a motor 25, a gear mechanism 27 configured to be operated by the motor 25, a timing belt 29 configured to be driven by the gear mechanism 27 and so on, wherein the carriage 23 is coupled to the timing belt 29. The motor 25 is configured to operate on a drive signal received from a motor driving unit 11G that is disposed in the interface unit 11E of the control unit 11.

The power generated by the motor 25 is transmitted to the carriage 23 through the gear mechanism 27 and timing belt 29. As a result, the carriage 23 moves in a left-right direction of FIG. 1 together with the image sensor 21.

The ADF unit 4 is provided with feed rollers 31 to 39 in order to feed documents along a predetermined path. The ADF unit 4 is also provided with a motor 41, a gear mechanism 43 that is actuated by the motor 41, and so on. The motor 41 is configured to operate on a drive signal received from a motor driving unit 11F disposed in the interface unit 11E of the control unit 11.

The power generated by the motor 41 is transmitted to the feed rollers 31 to 39 through the gear mechanism 43. Some of the feed rollers 31 to 39 are given as drive rollers that are directly driven by the gear mechanism 43, and some of the rest are given as follower rollers that rotate following the drive rollers or documents. The ADF unit 4 and the reading unit 3 cooperatively provide the multi-function device 1 with a function of an ADF image scanner.

[Details of the Main Body and Reading Unit]

Figure 3A:
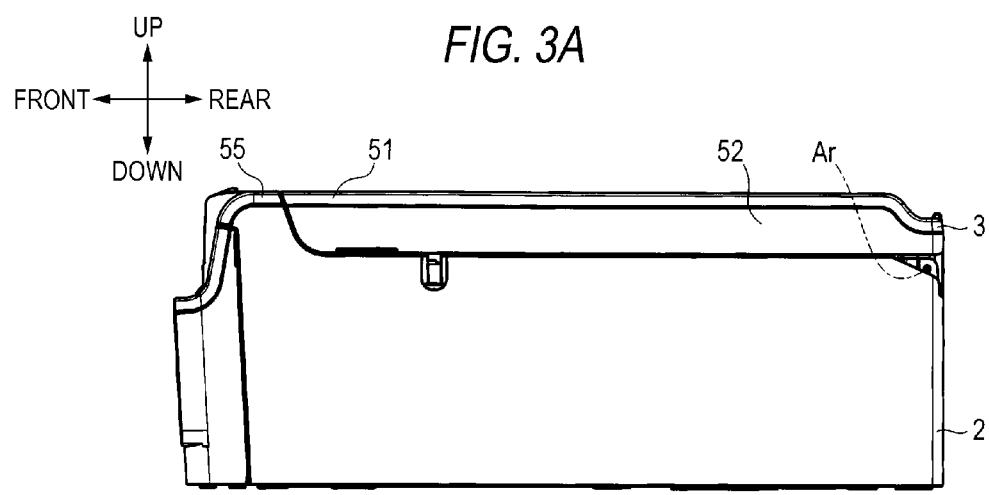
FIG. 3A is a right side view showing a main body and a reading unit moved in a close position.
Figure 3B:
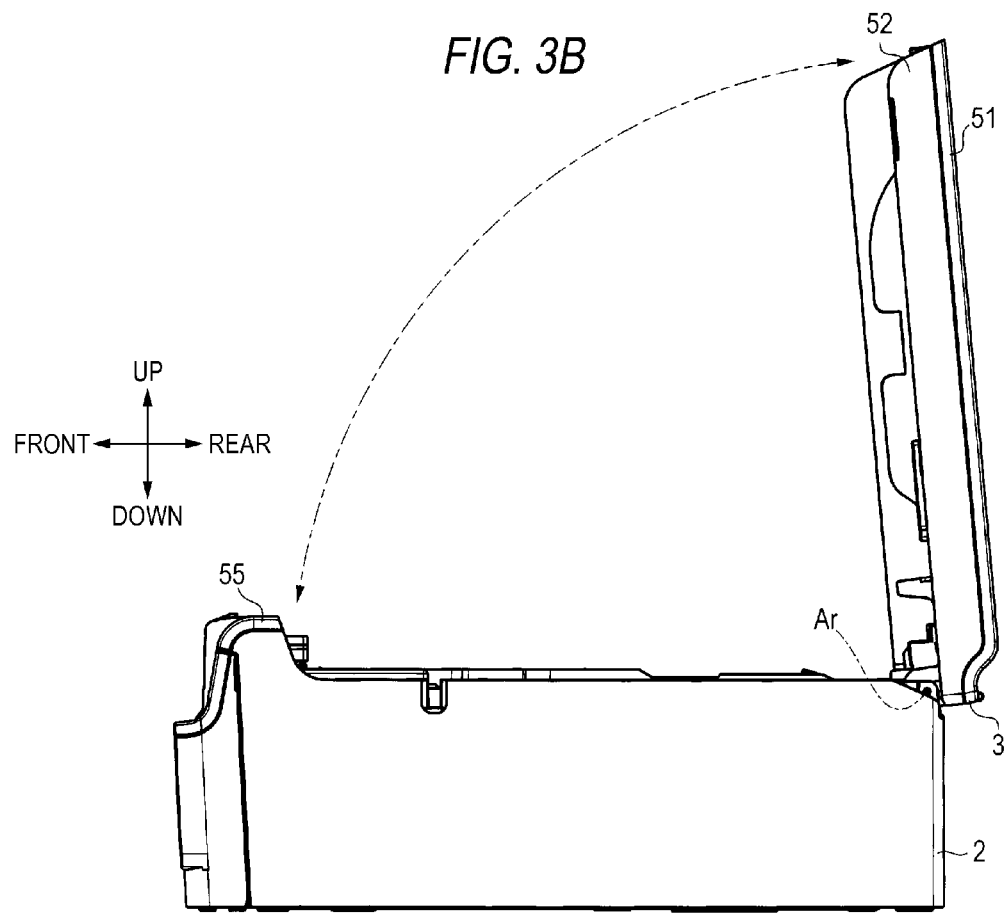
FIG. 3B is a right side view showing the main body and the reading unit moved in an open position.

The reading unit 3 is rotatably coupled to the main body 2 about a virtual axis Ar extending in a left-right direction, as shown in FIGS. 3A and 3B. This allows the reading unit 3 to move from/to a close position (see FIG. 3A) and an open position (see FIG. 3B). Incidentally, in FIGS. 3A and 3B, those (e.g. ADF unit 4, control panel 6, etc.) except for the main body 2 and reading unit 3 are omitted in the drawings.

In a case where the reading unit 3 moves to the close position, the opening in an upper face side of the main body 2 is closed by the reading unit 3. On the other hand, in a case where the reading unit 3 moves to the open position, the opening in the upper face side of the main body 2 is opened.

Figure 4:
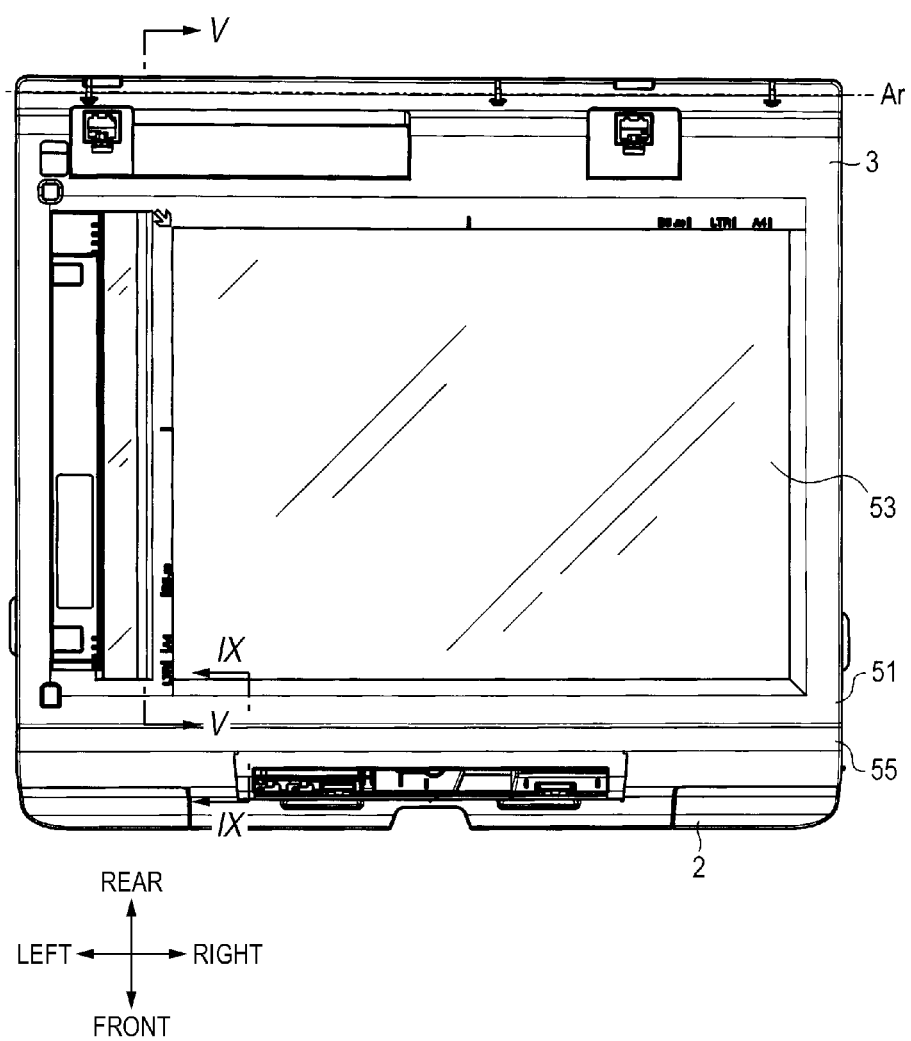
FIG. 4 is a plan view of the main body and reading unit.
Figure 5:
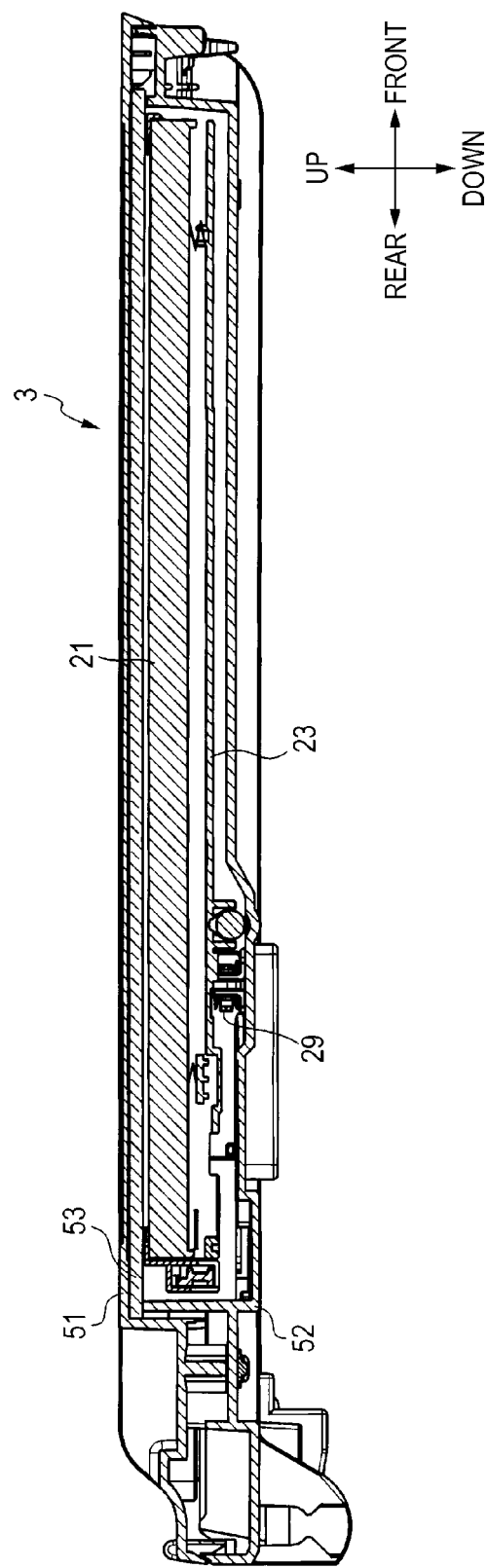
FIG. 5 is a sectional view in a region indicated by a line V-V in FIG. 4.

The reading unit 3 includes an upper supporting member 51 configuring an upper portion of the reading unit 3, a lower supporting member 52 configuring a lower portion of the reading unit 3 and a document table 53 made of glass, as shown in FIGS. 3, 4 and 5.

The document table 53 is held sandwiched between the upper supporting member 51 and the lower supporting member 52, as shown in FIG. 5. The image sensor 21, the carriage 23 and the timing belt 29 are disposed below the document table 53.

An exterior member 55 is disposed in a front top end of the main body 2, as shown in FIGS. 1 and 3. The exterior member 55 is disposed in a position adjacent the upper supporting member 51 in the case where the reading unit 3 is in the close position (see FIG. 3A). The upper supporting member 51 and the exterior member 55 have respective top surfaces shaped not to cause a difference in level across a boundary of the upper supporting member 51 and the exterior member 55 (e.g., disposing a flat plane extending from a top surface of the upper supporting member 51 over to a top surface of the exterior member 55) in the state the reading unit 3 is in the close position.

Figure 6:
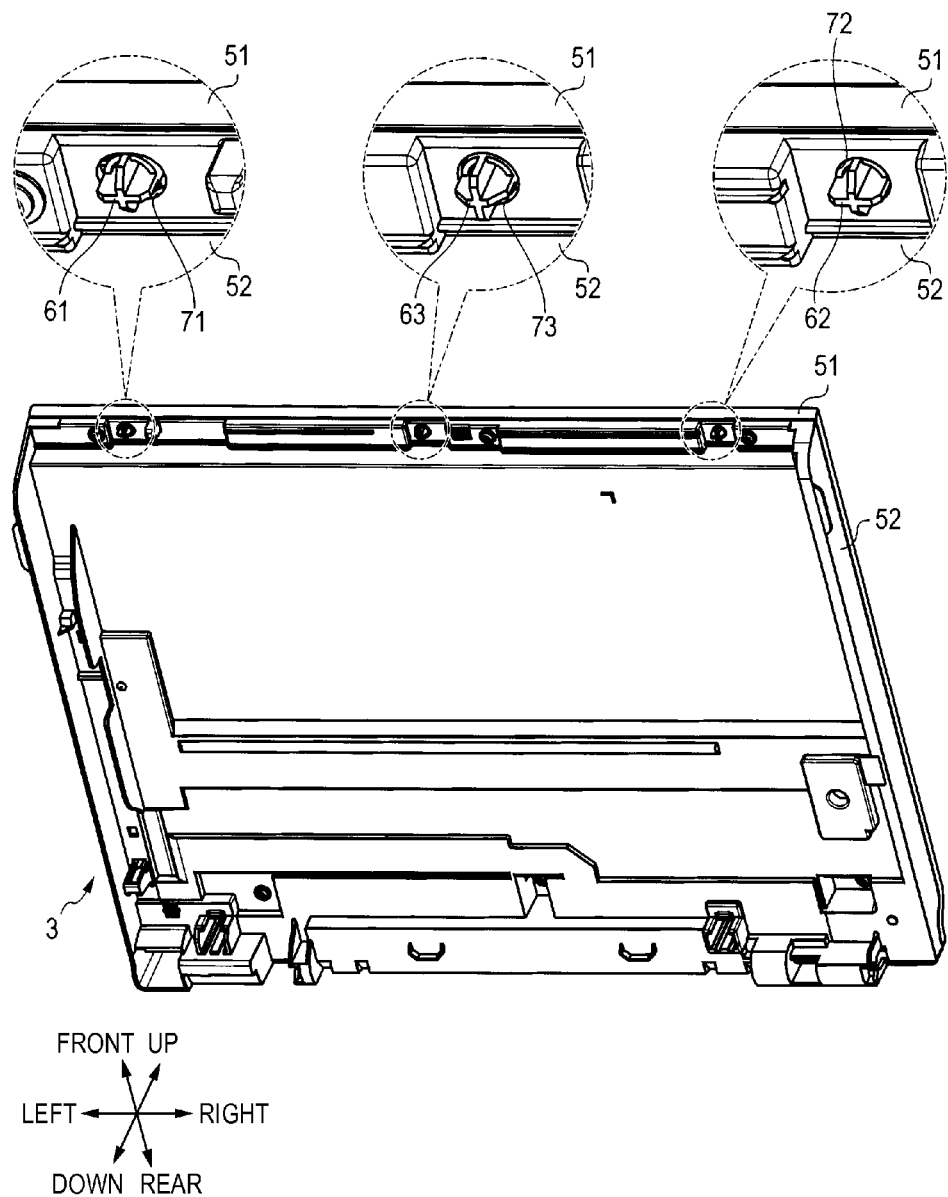
FIG. 6 is a perspective view showing the reading unit.
Figure 7:
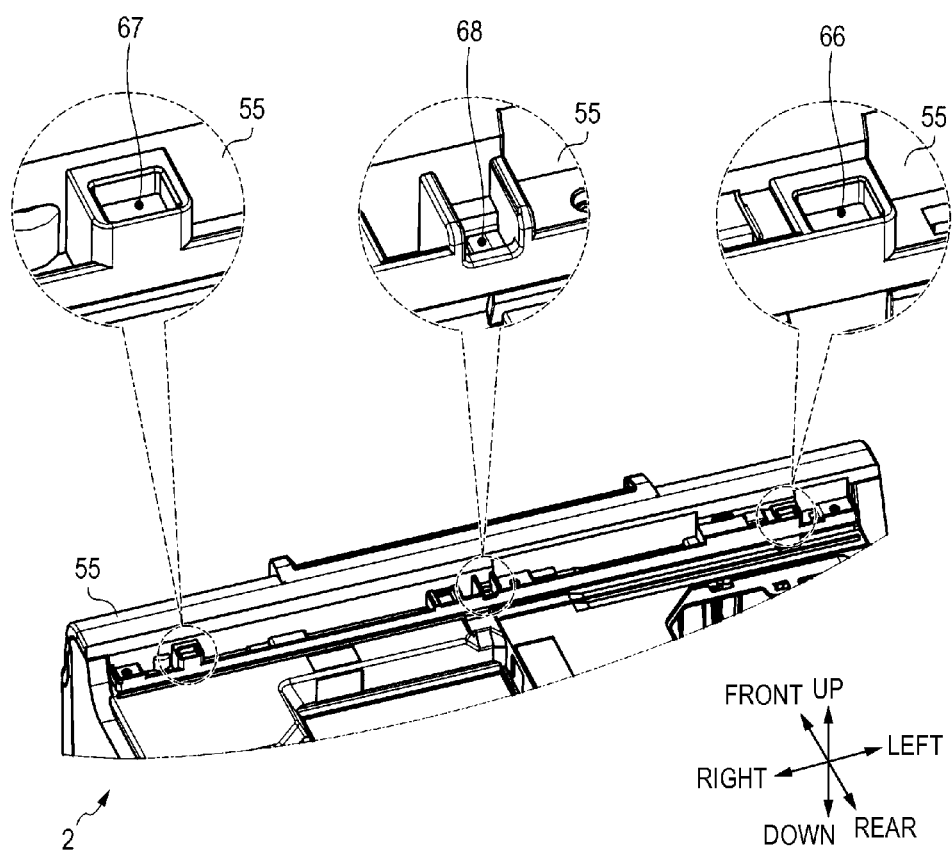
FIG. 7 is a perspective view showing part of the main body.

The reading unit 3 is provided with a first convex portion 61, a second convex portion 62 and a third convex portion 63, as shown in FIG. 6. The main body 2 is provided with a first concave portion 66, a second concave portion 67 and a third concave portion 68, as shown in FIG. 7.

Of these, the first convex portion 61 and the second convex portion 62 are arranged in positions closer to respective ends with respect to the left-right direction (e.g., a direction parallel to an axis serving as a rotation center of the reading unit 3) as shown in FIG. 6. The third convex portion 63 is arranged between the first convex portion 61 and the second convex portion 62. The first concave portion 66, the second concave portion 67 and the third concave portion 68 are formed in positions corresponding to the first convex portion 61, the second convex portion 62 and the third convex portion 63, respectively. Specifically, they are formed in a positional relationship that when the reading unit 3 is brought to the close position, the first convex portion 61 becomes fit with the first concave portion 66, the second convex portion 62 with the second concave portion 67 and the third convex portion 63 with the third concave portion 68, respectively.

The first convex portion 61, the second convex portion 62 and the third convex portion 63 are integrally formed as part of the upper supporting member 51 when forming the upper supporting member 51 by making use of a die, so that they project downward from a lower surface of the upper supporting member 51. The lower supporting member 52 is provided with a first through-hole 71, a second through-hole 72 and a third through-hole 73, as shown in FIG. 6. The first convex portion 61, the second convex portion 62 and the third convex portion 63 passes through the first through-hole 71, the second through-hole 72 and the third through-hole 73, respectively. According thereto, the first convex portion 61, the second convex portion 62 and the third convex portion 63 project at their lower ends downward further from the lower surface of the lower supporting member 52.

The first concave portion 66, the second concave portion 67 and the third concave portion 68 are integrally formed as part of the exterior member 55 when forming the exterior member 55 by making use of a die. Each of the first concave portion 66, the second concave portion 67 and the third concave portion 68 is made as a bottomed hole having an upper opening and a bottom.

Figure 8A:
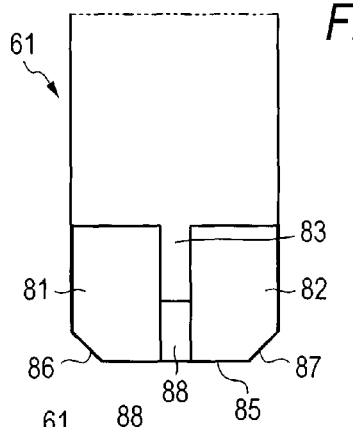
FIG. 8A is a front view of a first convex portion.
Figure 8B:
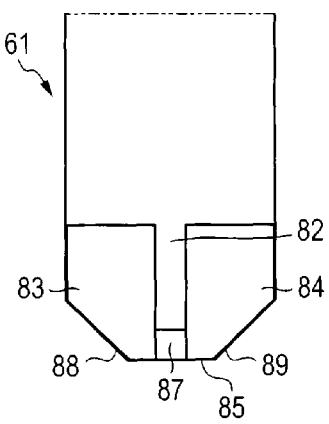
FIG. 8B is a right side view of the first convex portion.
Figure 8C:
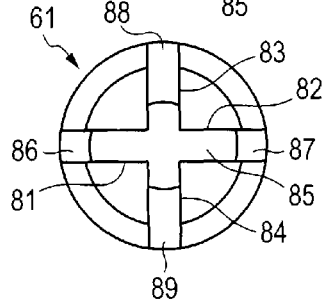
FIG. 8C is a bottom view of the first convex portion.

The first convex portion 61 and the second convex portion 62 have the same shape (hereinafter, first convex portion 61 only shown in FIGS. 8A to 8C). Each of the first and second convex portions 61, 62 is provided with four plate-like portions 81 to 84 radially extending from a center, as shown in FIGS. 8A to 8C. Of these, the plate-like portions 83, 84 abut at their peripheral end faces against respective inner surfaces of the first and second concave portions 66, 67, to thereby establish positioning of the upper supporting member 51 in a front-rear direction.

A flat face 85 is formed at a projection tip (or lower end) of each of the first and second convex portions 61, 62. Inclined faces 86 to 89 are formed at positions outer than the flat face 85. The inclined faces 86 to 89 incline toward a center of the first or second convex portion 61, 62 as approaching a projection tip of the first or second convex portion 61, 62.

The inclined faces 86 to 89 each incline at a predetermined angle (for example, at 45 degrees, in the present exemplary embodiment) relative to a projecting direction of the first or second convex portion 61, 62. Incidentally, the inclined surfaces 88, 89 disposed at front and rear sides reach closer to the center of the first or second convex portion 61, 62 than the inclined faces 86, 87 disposed at left and right sides.

Figure 8D:
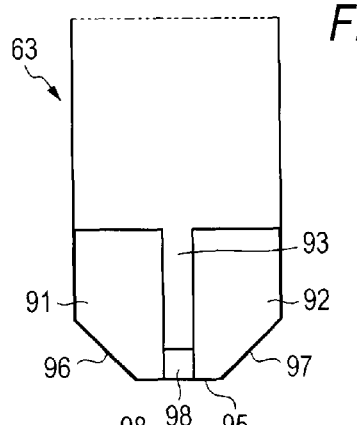
FIG. 8D is a front view of a third convex portion.
Figure 8E:
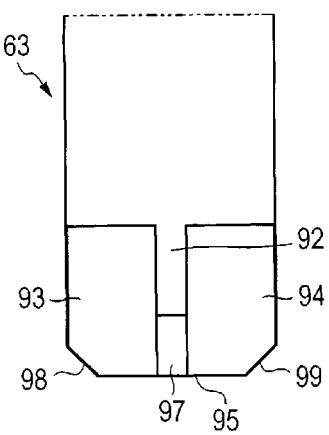
FIG. 8E is a right side view of the third convex portion and FIG. 8F is a bottom view of the third convex portion.
Figure 8F:
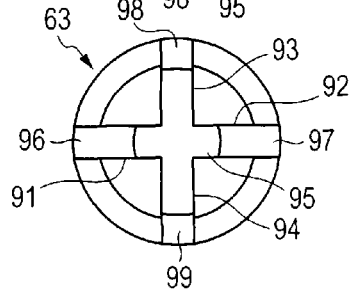

On the other hand, the third convex portion 63 is shaped with four plate-like portions 91 to 94 radially extending from a center, as shown in FIGS. 8D to 8F. Of these, the plate-like portions 91, 92 are configured to abut at their peripheral end faces against an inner surface of the third concave portion 68 so as to establish positioning of the upper supporting member 51 in the left-right direction.

A flat face 95 is formed at a projection tip (or lower end) of the third convex portion 63. Inclined faces 96 to 99 are formed at positions outer than the flat face 95. The inclined faces 96 to 99 incline toward a center of the third convex portion 63 as approaching a projection tip of the third convex portion 63.

The inclined faces 96 to 99 incline at a predetermined angle (for example, at 45 degrees, in the present exemplary embodiment) relative to the projection direction of the third convex portion 63. Incidentally, the inclined faces 96, 97 disposed at the left and right sides reach closer to the center of the third convex portion 63 than the inclined faces 98, 99 disposed at front and rear sides.

The above-described first, second and third convex portions 61, 62, 63 and the first, second and third concave portions 66, 67, 68 configures a positioning mechanism for establishing positioning of a relative position between the main body 2 and the reading unit 3 when the reading unit 3 is moved to its close position.

More specifically, in a case where the reading unit 3 is moved to the close position, the first and second convex portions 61, 62 fit respectively in the first and second concave portions 66, 67, whereby positioning of a relative position of the reading unit 3 with respect to the main body 2 in the front-rear and up-down directions can be established. The third convex portion 63 fits in the third concave portion 68, whereby positioning of a relative position of the reading unit 3 with respect to the main body 2 in the left-right direction can be established.

Figure 9:
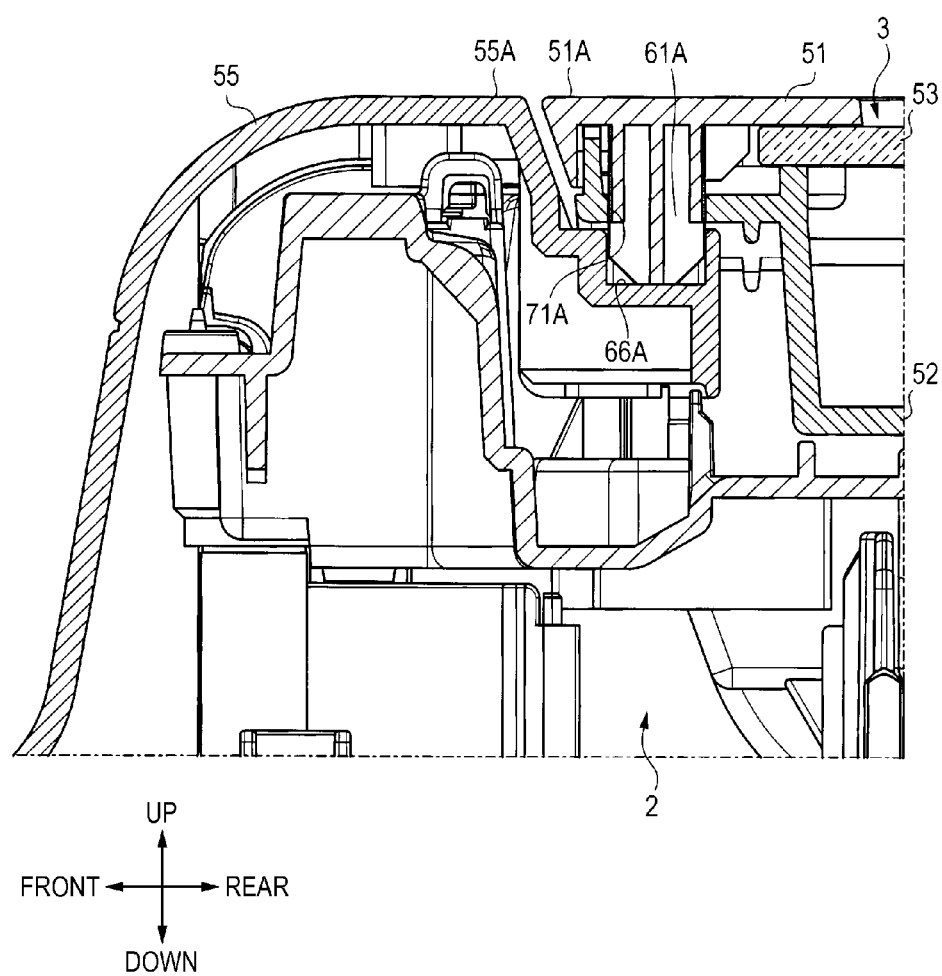
FIG. 9 is a sectional view in a region indicated by a line IX-IX in FIG. 4.

In the present exemplary embodiment, when the first and second convex portions 61, 62 respectively fit in the first and second concave portions 66, 67, their flat faces 85 abut against the respective bottoms 66A, 67A of the first and second concave portions 66, 67, as shown in FIG. 9 (the first convex portion 61 only shown, in FIG. 9). On the other hand, a tip of the third convex portion 63 does not reach the bottom of the third concave portion 68, because the bottom of the third concave portion 68 is deeper than the bottoms 66A, 67A of the first and second concave portions 66, 67.

Therefore, the first and second convex portions 61, 62 are involved in positioning in the up-down direction, whereas the third convex portion 63 is not involved in positioning in the up-down direction. Namely, in the present exemplary embodiment, the first and second convex portions 61, 62 are one example of abutting portions or projection portions, and the first and second concave portions 66, 67 are one example of abutted portions or fitted portions.

As for the positional relationship in the up-down direction, when establishing the positioning of the reading unit 3 with respect to the main body 2, specifically, positioning of the upper supporting member 51 of the reading unit 3 to the exterior member 55 of the main body 2 is accurately established. Namely, because the first and second convex portions 61, 62 are integrally formed with the upper supporting member 51 while the first and second concave portions 66, 67 are integrally formed with the exterior member 55, positioning between the upper supporting member 51 and the exterior member 55 are established without interposing other members, so that this positioning can be accurately established.

Therefore, the upper supporting member 51 and the exterior member 55 are positioned in height, at their top surfaces 51A, 55A, with accuracy. This makes it possible to suppress a difference in level from arising across a boundary of the upper supporting member 51 and the exterior member.

In other words, where many members are interposed between the upper supporting member 51 and the exterior member 55, assembly errors may arise in a range of their tolerances between the members. Such tolerances, if cumulate, may cause variations in height between the support member and the exterior member 55. In contrast, in the case where the direct positioning between the upper supporting member 51 and the exterior member 55 is established as in the present exemplary embodiment, there is no tolerance cumulation. Thus, the top surface 51A of the upper supporting member 51 and top surface 51A of the exterior member 55 can be well adjusted in height with each other.

[Advantages]

As described above, according to the multi-function device 1, in a case where the reading unit 3 is brought to the close position, the positioning mechanism is able to establish the positioning between the upper supporting member 51 and the exterior member 55 in the up-down direction accurately. According thereto, it is possible to prevent or suppress a difference in level from arising across a boundary of the support member 51 and the exterior member 55 in the up-down direction.

According to the multi-function device 1, the first and second convex portions 61, 62 fit in the first and second concave portions 66, 67, respectively. Thus, tips of the first and second convex portions 61, 62 establish positioning in the up-down direction and, simultaneously, side faces of the first and second convex portions 61, 62 establish positioning in the front-rear direction.

According to the multi-function device 1, by abutting the flat faces 85 disposed at respective tips of the first and second convex portions 61, 62 against the bottoms of the first and second concave portions 66, 67, positioning between the upper supporting member 51 and the exterior member 55 can be established. As compared to the case where flat faces 85 are not disposed, the area of abutment is well secured to suppress the concentration of loads at one point. Therefore, the first and second convex portions 61, 62 can be suppressed from being deformed or worn, to thereby suitably maintain the well state of positioning in the up-down direction.

According to the multi-function device 1, the first and second convex portions 61, 62 disposed at both ends of the upper supporting member 51 establish positioning in the front-rear direction (e.g., "in a direction perpendicular to both of the direction parallel to the axis serving as the rotation center of the reading unit and the up-down direction"). This can take the distance between the first convex portion 61 and the second convex portion 62 longer than the case of a positioning in the front-rear direction by utilization of the third convex portion 63 disposed at the center of the upper supporting member 51. This raises the parallelism with the rotation center of the reading unit 3.

Further, the third convex portion 63 located at the central establishes positioning in the left-right direction (e.g., "in the direction parallel to the axis serving as the rotation center of the reading unit"). This makes it possible to suppress the distance to any one of the left and right ends from excessively increasing, as compared to the case of the first and second convex portions 61, 62. According thereto, it is possible to suppress a cumulation of tolerances and to thereby enhance positioning accuracy.

According to the multi-function device 1, the first and second convex portions 61, 62 contact, at their end faces of the radially extending plate-like portions 81 to 84, the respective inner surfaces of the first and second concave portions 66, 67. The respective contact areas with the inner surfaces of the first and second concave portions 66, 67 are smaller as compared to those of cylindrical convex portions in shape. This reduces the frictional resistance between the first convex portion 61 and the second convex portion 62 to thereby smoothen the rotation of the reading unit 3.

In addition, by providing the inclined faces 86 to 89 to the first and second convex portions 61, 62, the first and second convex portions 61, 65 are formed smaller in cross section as approaching their tips. Thus, insertion/removal can be smoothly done to/from the first and second concave portions 66, 67, as compared to those with no inclined faces.

Specifically, the inclined face 86, 87 and the inclined face 88, 89 are equally angled but different in the distance from the center of the convex portion 61, 62. Thus, the first convex portion 61 and the second convex portion 62 are looked different in tip sharpness between as viewed in the front-rear direction and as viewed in the left-right direction. Differently from those of circularly cylindrical convex portions formed with truncated-cone tapered surfaces at tips, the first and second convex portions 61, 62 are adjustable in characteristics independently in the left-right direction or in the front-rear direction.

[Modifications]

Although the exemplary embodiment according to the invention has been described, the invention is not limited to the above concrete one exemplary embodiment but can be carried out variously in other exemplary embodiments.

For example, in the above-described exemplary embodiment, the reading unit 3 had the first and second convex portions 61, 62 corresponding to abutting portions or projection portions while the main body 2 had the first and second concave portions 66, 67 corresponding to abutted portions or fitted portions. However, the relationship may be reverse, e.g., the main body 2 may have elements corresponding to abutting portions or projection portions while the reading unit 3 may have elements corresponding to abutted portions or fitted portions.

In the above-described exemplary embodiment, the first and second convex portions 61, 62 are provided as example of abutting portions or projection portions. Alternatively, the third convex portion 63 may be configured to function as an abutting portion or projection portion. Namely, positioning may be done in the up-down direction by utilization of the third convex portion 63. In this case, any of the first convex portion 61 and the second convex portion 62 may be not for a positioning in the up-down direction. Namely, it is satisfactory if a positioning in the up-down direction is established by two or more convex portions.

In the above-described exemplary embodiment, the first, second and third convex portions 61, 62, 63 are each shaped with four plate-like portions radially extending. However, the plate-like portions are not limited to four in the number.

In the above-described exemplary embodiment, the image reading apparatus configured as the multi-function device is exemplified as an example of an image reading apparatus according to the invention. However, it is selective whether or not configured as a multi-function device. The configuration according to the invention may be applied in a single function of an image reader, photocopier or facsimile machine.

Exemplary embodiments of the present invention can provide at least the following illustrative, non-limiting embodiments.

The abutting portion may comprise a projection portion. The projection portion may be configured to pass through the lower supporting member and abut against the abutted portion.

According thereto, direct positioning between the upper supporting member and the exterior member can be established by utilizing the projection portion, which is simple in structure.

The abutted portion may comprise a fitted portion in which the projection portion is configured to be fit.

According thereto, the projection portion goes into fit in the fitted portion. Thus, a tip of the projection portion is able to establish the positioning in the up-down direction and, simultaneously, a side face of the projection portion is able to establish a positioning in a lateral direction (e.g. in a front-rear direction or in a left-right direction).

The projection portion may have a flat face at a tip, the flat face being configured to abut against a bottom of the fitted portion so as to establish the positioning of the relative position between the upper supporting member and the exterior member in the up-down direction.

According thereto, the positioning between the upper supporting member and the exterior member can be established by an abutment of the flat face at a tip of the projection portion against a bottom of the fitted portion. Thus, the area of abutment is well ensured as compared to the case with no flat face like that. This suppresses loads from concentrating at one point and hence the projection portion from being deformed or worn so that positioning accuracy can be kept well in an up-down direction.

The reading unit may be configured to be movable between the close position and the open position. The projection portion may comprise a first convex portion and a second convex portion that are disposed at two points spaced from each other in a direction parallel to an axis serving as a rotation center of the reading unit. The first convex portion and the second convex portion may be configured to perform relatively position the upper supporting member and the exterior member in the up-down direction and in a direction perpendicular to both of the direction parallel to the axis serving as the rotation center of the reading unit and the up-down direction. The reading apparatus may further comprise a third convex portion that is disposed in a position between the first convex portion and the second convex portion in the direction parallel to the axis serving as the rotation center of the reading unit, the third convex portion being configured to relatively position the upper supporting member and the exterior member in the direction parallel to the axis serving as the rotation center of the reading unit.

According thereto, the first and second convex portions disposed at both ends of the one of the upper supporting member and the exterior member establish positioning in the direction perpendicular to "the direction parallel to the axis serving as the rotation center of the reading unit and the up-down direction". Thus, the distance between these two projection portions disposed at both ends of the one of the upper supporting member and the exterior member can be taken greater than a case utilizing the projection portion disposed at the center thereof, it is possible to improve parallelism with the rotation center of the reading unit. Further, the third convex portion disposed at the center thereof establishes positioning in the direction parallel to the axis serving as the rotation center of the reading unit. Thus, the maximum distance among distances to respective ends of the one of the upper supporting member and the exterior member in the direction parallel to the axis can be made shorter than that of the projection portion disposed at one end or the other end thereof. The tolerances cumulated up to the element distant from the third convex portion are decreased to raise the positioning accuracy.

The projection portion may comprise a plurality of plate-like portions each having a plate thickness in a circumferential direction about an axis extending in a projecting direction the projection portion and extending radially from the axis.

According thereto, since the projection portions are shaped as above, when the projection portion goes into fit in the fitted portion, the plate-like portions radially extending become into contact at their end faces with the inner surface of the fitted portion. Thus, the area of contact between the projection portion and the inner surface of the fitted portion is smaller than the case where the projection portion has a circularly cylindrical shape, for example. This reduces the frictional resistance between the projection portion and the fitted portion and hence smoothens the rotation of the reading unit.

The projection portion may comprise: two of the plate-like portions extending parallel with the rotation center of the reading unit; and two of the plate-like portions extending perpendicular to the rotation center of the reading unit. Out of the four plate-like portions, the two plate-like portions extending perpendicular to the rotation center of the reading unit may be configured to establish positioning in a direction perpendicular to both of a direction parallel to an axis serving as a rotation center of the reading unit and the up-down direction.

Each of the four plate-like portions may have an inclined face formed at a peripheral end face of a tip portion of the projection portion, the inclined face being inclined toward a center of the projection portion as approaching a tip of the projection portion.

According thereto, there is no possibility that plate-like portions be caught at their tip corners in the fitted portion differently from a structure whose outer peripheral end faces of the tip portion of the projection portion extend in parallel with a projecting direction thereof. Therefore, the projection portion can be smoothly inserted in and removed from the fitted portion.

The abutted portion may comprise a first concave portion and a second concave portion that are disposed at two points spaced from each other in the direction parallel to the axis serving as the rotation center of the reading unit. A tip of the first convex portion and a tip of the second convex portion may be configured to contact a bottom of the first concave portion and a bottom of the second concave portion, respectively, in the case where the reading unit is moved to the close position.

The image reading apparatus may further comprise a third concave portion, which has wall portions at sides parallel to the axis serving as the rotation center of the reading unit, and in which the third convex portion is configured to fit in the case where the reading unit is moved to the close position.

The projection portion may comprise the plurality of plate-like portions at a tip side thereof.

Each of the plate-like portions may have an inclined face formed at a peripheral end face of a tip portion of the projection portion, the inclined face being inclined toward a center of the projection portion as approaching a tip of the projection portion. The projection portion may have a flat face at the tip.

One of the upper supporting member and the exterior member may be integrally provided with the abutting portion.

The other of the upper supporting member and the exterior member may be integrally provided with the abutted portion.

What is claimed is:
1. An image reading apparatus comprising:
 a main body having an opening in an upper face side thereof; and
 a reading unit that is mounted on the main body and is configured to move between a closed position in which the opening is closed and an open position in which the opening is opened;
 wherein the reading unit comprises:
  a document table;
  a lower supporting member that supports the document table from below;
  an upper supporting member that is in contact with an upper side of the document table and clamps the document table with the lower supporting member; and a reading device that is arranged between the document table and the lower supporting member and is configured to read an image of a document placed on the document table, wherein the main body comprises:

an exterior member arranged in a position adjacent to the upper supporting member in a case where the reading unit is moved to the closed position, wherein an upper surface of the exterior member and an upper surface of the reading unit form a flat plane in the case where the reading unit is moved to the closed position, wherein a distance between a top surface of the reading unit at a first convex portion and a lower end of the first convex portion in a protruding direction of the first convex portion is substantially equal to a distance of an imaginary line extending from a top surface of the exterior member at a first concave portion to a bottom of the first concave portion, wherein one of the upper supporting member and the exterior member comprises an abutting portion and another of the upper supporting member and the exterior member comprises an abutted portion, which the abutting portion is configured to be placed in direct abutment against in the case where the reading unit is moved to the closed position, so as to configure a positioning mechanism, and wherein the positioning mechanism is configured to establish positioning of a relative position between the upper supporting member and the exterior member in an up-down direction.

2. The image reading apparatus according to claim 1, wherein the abutting portion comprises a projection portion, and wherein the projection portion is configured to pass through the lower supporting member and abut against the abutted portion.

3. The image reading apparatus according to claim 2, wherein the abutted portion comprises a fitted portion in which the projection portion is configured to be fit.

4. The image reading apparatus according to claim 3, wherein the projection portion has a flat face at a tip, the flat face being configured to abut against a bottom of the fitted portion so as to establish the positioning of the relative position between the upper supporting member and the exterior member in the up-down direction.

5. The image reading apparatus according to claim 3, wherein the projection portion comprises the first convex portion and a second convex portion, the first convex portion and the second convex portion being disposed at two points spaced from each other in a direction parallel to an axis serving as a rotation center of the reading unit, wherein the first convex portion and the second convex portion are configured to relatively position the upper supporting member and the exterior member in the up-down direction and in a direction perpendicular to both the direction parallel to the axis serving as the rotation center of the reading unit and the up-down direction, and wherein the reading apparatus further comprises a third convex portion that is disposed in a position between the first convex portion and the second convex portion in the direction parallel to the axis serving as the rotation center of the reading unit, the third convex portion being configured to relatively position the upper supporting member and the exterior member in the direction parallel to the axis serving as the rotation center of the reading unit.

6. The image reading apparatus according to claim 3, wherein the projection portion comprises a plurality of plate-like portions each having a plate thickness in a circumferential direction about an axis extending in a projecting direction from the projection portion and extending radially from the axis.

7. The image reading apparatus according to claim 6, wherein the projection portion comprises:

two plate-like portions of the plurality of plate-like portions extending parallel with a rotation center of the reading unit; and two plate-like portions of the plurality of plate-like portions extending perpendicular to the rotation center of the reading unit, and wherein the two plate-like portions extending perpendicular to the rotation center of the reading unit are configured to establish positioning in a direction perpendicular to both of a direction parallel to an axis serving as a rotation center of the reading unit and the up-down direction.

8. The image reading apparatus according to claim 7, wherein each of the plurality of plate-like portions has an inclined face formed at a peripheral end face of a tip portion of the projection portion, the inclined face being inclined toward a center of the projection portion as approaching a tip of the projection portion.

9. The image reading apparatus according to claim 5, wherein the abutted portion comprises the first concave portion and a second concave portion, the first concave portion and the second concave portion being disposed at two points spaced from each other in the direction parallel to the axis serving as the rotation center of the reading unit, and wherein a tip of the first convex portion and a tip of the second convex portion are configured to contact the bottom of the first concave portion and a bottom of the second concave portion, respectively, in the case where the reading unit is moved to the closed position.

10. The image reading apparatus according to claim 9, further comprising:

a third concave portion, which has wall portions at sides parallel to the axis serving as the rotation center of the reading unit, and in which the third convex portion is configured to fit in the case where the reading unit is moved to the closed position.

11. The image reading apparatus according to claim 6, wherein the projection portion comprises the plurality of plate-like portions at a tip side thereof.

12. The image reading apparatus according to claim 6, wherein each of the plate-like portions has an inclined face formed at a peripheral end face of a tip portion of the projection portion, the inclined face being inclined toward a center of the projection portion as approaching a tip of the projection portion, and wherein the projection portion has a flat face at the tip.

13. The image reading apparatus according to claim 1, wherein one of the upper supporting member and the exterior member is integrally provided with the abutting portion.

14. The image reading apparatus according to claim 13, wherein another of the upper supporting member and the exterior member is integrally provided with the abutted portion.

15. The image reading apparatus according to claim 1, wherein one of the abutting portion and the abutted portion is integrally formed with the upper supporting member and another of the abutting portion and the abutted portion is integrally formed with the exterior member.

16. The image reading apparatus according to claim 1, wherein in the case where the reading unit is moved to the closed position, the reading device is accommodated inside the opening of the main body and is located below the upper surface of the exterior member.

17. The image reading apparatus according to claim 1, wherein the reading unit has a configuration corresponding to a flatbed image scanner.

18. The image reading apparatus according to claim 1, wherein in the case where the reading unit is moved to the closed position, the exterior member is arranged in the position adjacent to the upper supporting member in a direction that the reading device extends in.

19. The image reading apparatus according to claim 1, wherein the upper surface of the reading unit comprises an upper surface of the upper supporting member, and wherein the upper surface of the exterior member and the upper surface of the upper supporting member form the flat plane in the case where the reading unit is moved to the closed position.

* * * * *